United States Patent
Micali

(10) Patent No.: US 6,301,659 B1
(45) Date of Patent: *Oct. 9, 2001

(54) TREE-BASED CERTIFICATE REVOCATION SYSTEM

(76) Inventor: Silvio Micali, 459 Chestnut Hill Ave., Brookline, MA (US) 02146

(*) Notice: Subject to any disclaimer, the term of this patent is extended or adjusted under 35 U.S.C. 154(b) by 0 days.

This patent is subject to a terminal disclaimer.

(21) Appl. No.: 08/979,983

(22) Filed: Nov. 26, 1997

Related U.S. Application Data

(63) Continuation of application No. 08/741,601, filed on Nov. 1, 1996, now abandoned.
(60) Provisional application No. 60/006,143, filed on Nov. 2, 1995.

(51) Int. Cl.$^7$ ....................................................... H04L 9/32
(52) U.S. Cl. ............................................. 713/158; 713/157
(58) Field of Search ................................... 713/156, 157, 713/158

(56) References Cited

U.S. PATENT DOCUMENTS

| | | | |
|---|---|---|---|
| Re. 34,954 | 5/1995 | Haber et al. . | |
| 4,200,770 | 4/1980 | Hellman . | |
| 4,218,582 | 8/1980 | Hellman . | |
| 4,309,569 | * 1/1982 | Merkle | 380/25 |
| 4,326,098 | 4/1982 | Bouricius . | |
| 4,881,264 | * 11/1989 | Merkle | 380/25 |
| 4,926,480 | 5/1990 | Chaum . | |
| 4,943,707 | 7/1990 | Boggan . | |
| 5,003,597 | 3/1991 | Merkle . | |
| 5,005,200 | 4/1991 | Fischer | 380/30 |
| 5,016,274 | 5/1991 | Micali . | |
| 5,136,646 | 8/1992 | Haber et al. . | |
| 5,136,647 | 8/1992 | Haber et al. . | |
| 5,157,726 | 10/1992 | Merkle . | |
| 5,231,666 | * 7/1993 | Matyas | 380/25 |
| 5,261,002 | 11/1993 | Perlman . | |
| 5,315,657 | * 5/1994 | Abadi et al. | 380/25 |
| 5,340,969 | 8/1994 | Cox . | |
| 5,396,624 | 3/1995 | Campbell, Jr. . | |
| 5,420,927 | 5/1995 | Micali . | |
| 5,432,852 | * 7/1995 | Leighton et al. | 380/30 |
| 5,434,919 | * 7/1995 | Chaum | 380/30 |
| 5,450,493 | 9/1995 | Maher | 380/30 |
| 5,497,422 | * 3/1996 | Tysen et al. | 380/25 |
| 5,537,475 | 7/1996 | Micali | 380/30 |
| 5,544,322 | 8/1996 | Cheng . | |
| 5,551,027 | 8/1996 | Choy et al. . | |
| 5,604,804 | * 2/1997 | Micali | 380/25 |
| 5,606,617 | 2/1997 | Brands . | |
| 5,610,982 | * 3/1997 | Micali | 380/25 |
| 5,615,268 | * 3/1997 | Bisbee et al. | 380/25 |
| 5,659,616 | 8/1997 | Sudia | 380/23 |
| 5,666,416 | 9/1997 | Micali | 380/23 |
| 5,677,955 | 10/1997 | Doggett et al. | 380/24 |
| 5,687,235 | 11/1997 | Perlman et al. | 380/25 |
| 5,699,431 | 12/1997 | Van Oorschot et al. | 380/30 |
| 5,717,757 | 2/1998 | Micali | 380/25 |
| 5,717,758 | 2/1998 | Micali | 380/25 |
| 5,826,262 | 10/1998 | Bui et al. . | |
| 5,903,651 | * 5/1999 | Kocher | 713/158 |

OTHER PUBLICATIONS

Menezes et al, "Handbook fo Applied Cryptography." ©1997. pp 566, 576, 577, 588, 589, 706, 716, 720, 728, 729, 737, 751.*
U.S. application No. 90/004215, Micali, filed Apr. 10, 1996.
U.S. application No. 08/608,134, Micali, filed Feb. 28, 1996.
U.S. application No. 08/636,854, Micali, filed Apr. 23, 1996.
U.S. application No. 08/649,905, Micali, filed May 15, 1996.
U.S. application No. 08/648,344, Micali, filed May 15, 1996.
U.A. application No. 08/729,619, Micali, filed Oct. 11, 1996.
U.S. application No. 08/753,589, Micali, filed Nov. 26, 1996.
U.S. application No. 08/763,536, Micali, filed Dec. 9, 1996.
CygnaCom Solutions, Inc., "Federal Public Key Infrastructure (PKI) Technical Specifications Part D—Interoperability Profiles, "Published on the World Wide Web, Sep. 27, 1995, 91 pages.
Nazario, N., "Federal Public Key Infrastructure (PKI) Version 1 Technical Specifications: Part B—Technical Security Policy, "Published on the World Wide Web, Mar. 13, 1996, 20 pages.
Polk, W., editor, "Federal Public Key Infrastructure (PKI) Technical Specifications (Version 1) Part A: Requirements," Published on the World Wide Web, Dec. 6, 1996, 18 pages.
Ford, Warwick, "A Public Key Infrastructure for U.S. Government Unclassified but Sensitive Operations," Published on the World Wide Web, Sep. 1, 1995, 93 pages.
Chokhani, Santosh, et al., "Certificate Policy and Certification Practice Statement Framework", Published on the World Wide Web, Nov. 3, 1996.
Burr, William E. et al., "A Proposed Federal PKI Using X.509 V3 Certificates," Published on the World Wide Web.
U.S. application No. 60/006,038, Micali, filed Oct. 24, 1995.
U.S. application No. 08/756,720, Micali, filed Nov. 26, 1996.
U.S. application No. 60/.033,415, Micali, Dec. 18, 1996.
Burr, W.E., "Public Key Infrastructure (PKI) Technical Specifications (Version 1): Part C—Concept of Operations," Published on the World Wide Web, Feb. 12, 1996, 30 pages.
Ford, Warwick, "Public–Key Infrastructure Standards," Published on the World Wide Web, Oct. 1996, 15 printed pages.

(List continued on next page.)

*Primary Examiner*—Gilberto Barron, Jr.
*Assistant Examiner*—Steve Kabakoff
(74) *Attorney, Agent, or Firm*—Hutchins, Wheeler & Dittmar

(57) ABSTRACT

A method and system for overcoming the problems associated with certificate revocation lists (CRL's), for example, in a public key infrastructure. The invention uses a tree-based scheme to replace the CRL.

23 Claims, No Drawings

OTHER PUBLICATIONS

Polk, William T., "Minimum Interoperability Specifications for PKI Components," Published on the World Wide Web, Nov., 1996.

Chokhani, Santosh, "Security Considerations in Using X. 509 Certificates," Published on the World Wide Web.

Dodson, Donna F., "NIST PKI Implementation Projects," Published on the World Wide Web.

Burr, William, "A Proposed Federal PKI Using X. 509 V3 Certificates: The NISSC Presentation," Published on the World Wide Web.

Nazario, Noel et al., "Management Model for the Federal Public Key Infrastructure," Published on the World Wide Web, Oct. 24, 1996.

Nazario, Noel A., "Security Policies for the Federal Public Key Infrastructure," Published on the World Wide Web, Oct. 24, 1996.

Burr, William, et al., "MISPC: Minimum Interoperability Specifications for PKI Components," Published on the World Wide Web, Dec. 2, 1996.

Escrowed Encryption Standard (EES) FIPS Pub. 185, Feb. 9, 1994.

Chaum, D., "Untraceable Electronic Mail, Return Addresses, and Digital Pseudonyms," *Communications of the ACM*, vol. 24, No. 2, Feb. 1981, pp. 84–88.

Gennaro, Rosario et al., "Robust Threshold DSS Signatures," Abstract from *EuroCrypt '96*.

Harn, L., "Group Oriented (t,n) threshold digital signature scheme and digital multisignature," *IEE Proc.–Comput. Digit. Tech.*, vol. 141, No. 5, Sep. 1994, pp. 307–313.

Micali, Silvio, "Enhanced Certificate Revocation System," Technical Report, Nov. 1995.

Rivest, Ronald et al., "SDSI—A Simple Distributed Security Infrastructure," Sep. 15, 1996, Published on the World Wide Web.

Farrell, S., et al., "Internet Public Key Infrastructure Part III: Certificate Management Protocols," Published on the World Wide Web, Dec. 1996, 83 printed pages.

Farrell, S., et al., "Internet Public Key Infrastructure Part III: Certificate Management Protocols," Published on the World Wide Web, Jun. 1996, pp. 1–36.

ANSI x9.57–199x "Public Key Cryptography for the Financial Services Industry: Certificate Management," (working draft), Jun. 21, 1996, 86 pages.

ANSI X9.55–199X "Public Key Cryptography for the Financial Services Industry: Extensions to Public Key Certificates and Certificate Revocation Lists," (working draft), Jul. 3, 1996, 37 pages.

"Final Text of Draft Amendments DAM 4 to ISO/IEC 9594–2, DAM 2 to ISO/IEC 9594–6, DAM 1 to ISO/IEC 9594–7, and DAM 1 to ISO/IEC 9594–8 on Certificate Extensions," Jun. 30, 1996, 41 pages.

International Standard ISO/IEC 9594–8, "Information Technology—Open Systems Interconnection—The Directory: Authentication Framework," *ISO/IEC*, second edition, Sep. 15, 1996.

"Public Key Infrastructure Study—Final Report," National Institute of Standards and Technology, Apr. 1994.

Bellare, M., et al., "Incremental Cryptology: The Case of Hashing and Signing," Proceedings of Crypto '95, 1995, pp. 216–233.

Housley, R., et al., "Internet Public Key Infrastructure Part I: X.509 Certificate and CRL Profile," Jun. 1996, Published on the World Wide Web, pp. 1–30.

Kent et al., "Privacy Enhancement for Internet Electronic Mail: Part II—Certificate–Based Key Management," IAB Task Force, Request for Comments No. 114, Aug. 1989, pp. 1–22.

Lamport, L., "Password Authentication with Insecure Communication," *Communications of the ACM*, Nov. 1981, pp. 770–772.

Linn, J., "Privacy Enhancement for Internet Electronic Mail: Part I—Message Encipherment and Authentication Procedures," IAB Privacy Task Force, Request for Comments No. 113, Aug. 1989, pp. 1–30.

Micali, S. et al., "An Efficient Zero–Knowledge Method for Answering Is He In or Out?," Abstract, presented by M. Rabin at the National Computer Science Institute in Berkeley, CA, Dec. 1995.

Micali, S., "Computationally–Sound Proofs," Apr. 11, 1995, *MIT Laboratory for Computer Science*, 55 pages.

Rivest, et al., "A Method for Obtaining Digital Signatures and Public–Key Cryptosystems," *Communications of the ACM*, Feb. 1978, pp. 120–126.

Rivest, et al., "PayWord and MicroMint: Two Simple Micropayment Schemes," Nov. 7, 1995, *MIT Laboratory for Computer Science/Weizmann Institute of Science*, 11 pages.

Elgamal, et al., *Securing Communications on the Intranet and Over the Internet*, Netscape Communications Corporation, Jul. 1996.

Facsimile message from Chini Krishnan of Integris Security, Inc. to Professor Silvio Micali dated Feb. 17, 1997, 7 pages including cover sheet, submitted in attached sealed envelope as Proprietary Material Not Open to Public. To be Opened Only by Examiner of Other Authorized Patent and Trademark Office Employee.

Facsimile message from Chini Krishnan of Integris Security, Inc. to Professor Silvio Micali, dated Feb. 25, 1997, 12 pages including cover sheet submitted in attached sealed envelope as Proprietary Material Not Open to Public. To be Opened Only by Examiner or Other Authorized Patent and Trademark Office Employee.

International Search Report from PCT/US 96/17374, dated Feb. 19, 1997, 7 pages.

Toward a national public key infrastructure, IEEE Communications Magazine, Sep. 1994, vol. 32, No. 9, ISSN 0163–6804, pp. 70–74.

The Digital Distributed System Security Architecture, Proceedings of the $12^{th}$ National Computer Security Conference, 1989, pp. 305–319.

One page e–mail message from Dr. Micali to Integris dated Mar. 4, 1997, regarding references AR and AS.

Two page e–mail message from Dr. Micali to Integris dated Mar. 4, 1997, mentioning references AR and AS.

One page reply e–mail message from Integris to Dr. Micali dated Mar. 5, 1997, confirming confidential status of references AR and AS.

U.S. application No. 60/004,796, Micali, S., filed Oct. 2, 1995.

U.S. application No. 08/559,533, Micali, S., filed Nov. 16, 1995.

U.S. application No. 60/025,128, Micali, S., files Aug. 29, 1996.

U.S. application No.60/024,786, Micali, S., filed Sep. 10, 1996.

U.S. application No. 08/715,712, Micali, S., filed Sep. 19, 1996.

U.S. application No. 08/728,675, Micali, S., filed Oct. 10, 1996.
U.S. application No. 08/746,007, Micali, S., filed Nov. 5, 1996.

*A Dictionary of Modern Legal Usage,* Oxford University Press 1987, p. 930.

* cited by examiner

TREE-BASED CERTIFICATE REVOCATION SYSTEM

This application is a continuation of application Ser. No. 08/741,601, filed on Nov. 1, 1996, now abandoned.

Application is based on U.S. provisional patent application No. 60/006,143 filed on Nov. 2, 1995.

TECHNICAL FIELD

The present invention relates generally to secure communications and more particularly to schemes for certificate management.

BACKGROUND OF THE INVENTION

In many settings, it is necessary to certify certain data, as well as to revoke already issued certificates. For instance, in a Public-Key Infrastructure, (PKI) it is necessary to certify users' public keys.

In a digital signature scheme, each user U chooses a signing key $SK_u$ and a matching verification key, $PK_u$. User U uses $SK_u$ to compute easily his digital signature of a message m, $SIG_u(m)$, while anyone knowing that $PK_u$ is U's public key can verify that $SIG_u(m)$ is U's signature of m. Finding $SIG_u(m)$ without knowing $SK_u$ is practically impossible. On the other hand, knowledge of $PK_u$ does not give any practical advantage in computing $SK_u$. For this reason, it is in U's interest to keep $SK_u$ secret (so that only he can digitally sign for U) and to make $PK_u$ as public as possible (so that everyone dealing with U can verify U's digital signatures). At the same time, in a world with millions of users, it is essential in the smooth flow of business and communications to be certain that $PK_u$ really is the legitimate key of user U. To this end, users' public keys are "certified." At the same time it is also necessary to revoke some of the already-issued certificates.

CERTIFICATION AND REVOCATION OF PUBLIC KEYS.

Typically, certificates for users' public keys are produced and revoked by certifying authorities called CA's. A complete public-key infrastructure may involve other authorities (e.g., PCAS) who may also provide similar services (e.g., they may certify the public keys of their CA's). The present inventions can be easily applied to such other authorities. A CA can be considered to be a trusted agent having an already certified (or universally known) public key. To certify that $PK_u$ is U's public key, a CA typically digitally signs $PK_u$ together with (e.g., concatenating it with) U's name, a certificate serial number, the current date (i.e., the certification or issue date), and an expiration date. (Before certifying U's public key, it is necessary to perform additional steps, such as properly identifying user U. The present invention, however, does not depend on these additional steps). The CA's signature of $PK_u$ is then inserted in a Directory and/or given to U himself.

Upon receiving the (alleged) digital signature of user U of a message M, $SIG_u(M)$, a recipient R needs to obtain a certificate for $PK_u$. (Indeed, $SIG_u(M)$ may be a correct digital signature of M with respect to some public key $PK_u$, but R has no guarantee that $PK_u$ is indeed U's public key). Recipient R may obtain this certificate from the Directory, or from his own memory (if he has previously cached it), or from U himself. Having done this, R verifies (1) the correctness of the CA's certificate for $PK_u$ with respect to the CA's public key, and (2) the correctness of $SIG_u(M)$ with respect to $PK_u$. (If the CA's public key is not universally known, or cached with R, then a certificate for this key too must be obtained.)

Certificate retrieval is thus possible, although not necessarily cheap. Unfortunately, however, this is not the only retrieval that R needs to do. Indeed, it is crucially important that R makes sure that the certificate for $PK_u$ has not been revoked. This check, of course, may not be needed after the certificate's expiration date, but is needed during the certificate's alleged lifetime. A user's certificate can be revoked for a variety of reasons, including key compromise and the fact that the user is no longer associated with a particular CA.

To enable a recipient to establish whether a given certificate has been revoked, it is known that each CA periodically issues and gives the Directory a Certificate Revocation List (CRL for short), in general containing an indication of all the (not yet expired) certificates originally issued by it. A CRL typically consists of the issuer's digital signature of (1) a header comprising the issuer's name (as well as the type of his signature algorithm), the current date, the date of the last update, and the date of the next update, together with (2) a complete list of revoked certificates (whose date has not yet expired), each with its serial number and revocation date. Since it is expected that a CA revokes many of her certificates, a CRL is expected to be quite long.

After performing some checks on the CA's CRL (e.g., checking the CA's digital signature, checking that the CRL has arrived at the expected time, that a certificate declared revoked in the previous CRL of that CA—and not yet expired—still is revoked in the current CRL, etc.), the Directory stores it under its CA name.

When a user queries the Directory about the revocation of a certificate issued by a given CA, the Directory responds by sending to the user the latest CRL of that CA. The user can then check the CRL signature, the CRL dates (so as to receive a reasonable assurance that he is dealing with the latest one), and whether or not the certificate of interest to him belongs to it.

While CRLs are quite effective in helping users establishing which certificates are no longer deemed valid, they are also extremely expensive, because they tend to be very long and need to be transmitted very often.

The National Institute of Standards and Technology has tasked the MITRE Corporation to study the organization and cost of a PKI for the Federal Government. This study estimates that CRLs constitute by far the largest entry in the Federal PKI's cost list. According to MITRES's estimates/assumptions, in the Federal PKI there are about three million users, each CA serves 30,000 users, 10% of the certificates are revoked (5% because of key compromise and 5% because of change in affiliation with the organization connected to a given CA). CRLs are sent out bi-weekly, and, finally, the recipient of a digital signature requests certificate information 20% of the time. (The remaining 80% of the time he will be dealing with public keys in his cache). The study envisages that each revoked certificate is specified in a CRL by means of about 9 bytes: 20 bits of serial number and 48 bits of revocation date. Thus, in the Federal PKI, each CRL is expected to comprise thousands of certificate serial numbers and their revocation dates; the header, however, has a fixed length, consisting of just 51 bytes.

At 2 cents per kilobyte, the impact of CRL transmission on the estimated yearly costs of running the Federal PKI is stunning: if each federal employee verifies 100 digital signatures per day on average, then the total PKI yearly costs are $10,848 Millions, of which $10,237 Millions are due to CRL transmission. If each employee is assumed to verify just 5 digital signatures a day on average, then the total PKI yearly costs are $732 Millions, of which 563 Millions are due to CRL transmission.

The MITRE study thus suggests that any effort should be made to find alternative and cheaper CRL designs. This is indeed the goal of the present invention.

BRIEF SUMMARY OF THE INVENTION

To avoid the dramatic CRL costs, a novel Certification Revocation System is described, where requesting users no longer receive the latest list of revoked certificates (of a given CA). The scheme utilizes a known tree-based authentication technique in a novel way to overcome the problems associated with the prior art.

It is thus a primary object of this invention to provide certificate management without providing CRL's to a user requesting information about the certificate (e.g, its validity). Although special CRL's still may be used between CA's and the Directory in this scheme, the tree-based technique allows the Directory to convince users of whether or not a given certificate is still valid in a way that is essentially individualized, and thus quite convenient.

DETAILED DESCRIPTION AND PREFERRED EMBODIMENT

A known scheme for authenticating an item in a list of items is described in U.S. Pat. No. 4,309,569 to Merkle, and the disclosure therein is hereby incorporated by reference. Familiarity with the Merkle scheme is assumed in the following discussion.

By way of brief background, assume that the set S of certificates consists of n items, where, for convenience, n is a power to two: $n=2^k$ (else, we may introduce "dummy" items so that this is the case). The set organizer sorts (e.g., lexicographically) the items in S and then tree-hashes them as taught by Merkle. That is, let H be a one-way hash function, mapping strings of any length into B-bit strings (e.g., B=200). Then conceptually, the organizer stores the ith item, $I_i$, into the ith leaf of a full binary tree with n leaves. Then, he fills the remaining nodes of the tree in a bottom-up fashion, by storing in every internal node the hash of the concatenation of the content of its two children. In order to develop a minimum of terminology, let N be an internal node where the left child is L and the right child is R, and let $V_L$ be the value stored in L and $V_R$ the value stored in R (we shall refer to $V_L$ and $V_R$ as, respectively, a left-value and a right-value). Then, the organizer stores in node N the B-bit value $H(V_L V_R)$.

In one embodiment of the invention it is assumed that there are two (2) distinct trees (or more precisely, "tree-hashes"), a first tree in which information about issued but non-revoked certificates is stored, and a second tree in which information about revoked certificates is stored. Thus, for example, if the system has had 30,000 certificates issued but 3,000 of these have been revoked, the first tree would include information about the 27,000 certificates that remain valid while the second tree would store the information about the 3,000 revoked certificates. Thus, in this embodiment there is a tree-hash for the non-revoked certificates and a separate tree-hash for the revoked ones. In such case, the root values of these trees may be digitally signed by a CA (together with other information deemed proper) either separately or together; and the Directory uses the first tree to prove to a user that a given certificate is still deemed valid, and the second tree to prove that a certificate has been revoked. The CA builds both trees so that a given certificate (serial number) does not belong to both, but the Directory can also check for this property. Again, this and other operations may be facilitated if the serial number or any representation of the certificate that is deemed proper are ordered when inserted in the tree leaves. Among the various representations of a certificate, of course, one may use the certificate itself.

While the above technique is advantageous, in the preferred embodiment each leaf of the tree-hash stores the serial number of an issued and not-yet-expired certificate, together with an additional bit indicating whether or not the corresponding certificate is no longer valid (i.e., it has been revoked), and, if so, the revocation date. Of course, additional information can be stored about each or some of the serial numbers (e.g., certification date, etc.). Also, some of this information (e.g., the revocation date) can be removed or changed, and some other way of referring to a certificate can be used rather than the serial number, although within the scope of the present invention.

Thus in this case the same tree-hash is used to represent the set of issued and not-yet-expired certificates as well as the set of revoked (not-yet-expired) certificates.

In either embodiment, a problem may arise when the user queries the Directory with a serial number not corresponding to any issued certificate. (Indeed, while many times the user has already seen a certificate and accesses the Directory just to confirm the current validity of that certificate, at other times the user wishes to obtain the corresponding certificate from the Directory). If the corresponding certificate "does not exist," the Directory is at a loss to proceed. If the Directory responds truthfully, it may not be believed by the user. If the Directory gives the users all the certificates in its possession (or those relative to a given CA) the user may suspect that the Directory left out the certificate of interest. This problem exists as well in a CRL-based system. Indeed, even if the Directory gives the user all possible tree-based information or just the latest CRL of a given CA, this does not prove to the user that the certificate in question does not exist. (In fact, the actions of the Directory may actually be interpreted as saying that the certificate is valid because it does not appear to have been revoked.) Thus in this thorny situation the Directory would have to be trusted.

To rectify this problem, it is desired to have the Directory digitally sign that the certificate specified by the user is not among the existing or the not-yet-expired ones. This scheme at least may prevent frivolous answers by putting some liability on the Directory. Better yet, it is preferred that a CA periodically give the Directory a tree-hash specification of the status of all possible serial numbers at that time. For instance, because it is envisioned that a serial number consists of bits, the CA stores these serial numbers in the leaves of a depth-20 (full) tree-hash, together with an additional bit: 0 if not-yet-expired corresponding certificate exists, and 1 otherwise. After completing the hashing, the CA will digitally sign the root value (alone, or together with the root values of some other tree-hash). This enables the Directory to prove to the user that a serial number does not correspond to any issued and not-yet-expired certificate, namely, by giving the user the digital signature of the root value of this last tree-hash, and then the content of the leaf containing the serial number (or other specification) and the content of the siblings of the path from that leaf to the root.

Just like in the preferred embodiment of the underlying tree-hash scheme itself, one may have two separate trees for this purpose: one tree-hashing the serial numbers of issued and not-yet-expired certificates, and the other tree-hashing the serial numbers not corresponding to issued and not-yet-expired certificates. Of course, one may wish instead to merge together all possible tree-hashes mentioned so far (and possibly others) by having a CA generate a single tree-hash with $2^{20}$ leaves (i.e., with as many leaves as possible serial numbers), where each leaf stores the corresponding serial number, together with information specifying whether that serial number has been allocated or not, and, if so, whether its certificate has been revoked or not, and possibly other information (e.g, in case of revocation, the revocation date).

It should be appreciated that the above envisions each leaf corresponding to a serial number for simplicity only. For instance if all the information deemed appropriate about a serial number is no more than 80 bits, each leaf may deal with two serial numbers, provided of course that the information is properly coded so as not to generate confusions, errors or ambiguity. Smaller tree hashes may be built this way.

It should further be realized this type of digital signature allows batch processing. Namely, rather than signing n quantities separately, a signer tree-hashes them so as to obtain a single root-value, and then digitally signs this root-value (together with additional quantities if desired) when requested to give the signature of quantity i, the signer gives his digital signature of the root, and then the content of leaf i, and the content of the sibling of the party from that leaf to the root. This is a way to substitute n individual signatures (that can be expensive to obtain) with just one signature and n−1 hashing (which are not expensive at all). Notice that the signer does not need to be the one who supplies individualized signatures; if he transfers the n quantities (or the entire tree hash) together with his signature of the root to someone else, he may supply the signatures on demand. Notice that any signature scheme can be used for the root, including pen-written signatures, rather than digital ones.

The foregoing has outlined some of the more pertinent objects and details of a preferred embodiment of the present invention. These objects and details should be construed to be merely illustrative of some of the more prominent features and applications of the invention. Many other beneficial results can be attained by applying the disclosed invention in a different manner or modifying the invention as will be described. Those skilled in the art will recognize that the invention can be practiced, with modification, in other and different certification methods and schemes within the spirit and scope of the invention.

One of the preferred implementations of the various routines disclosed above is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While the invention has been disclosed in connection with the preferred embodiments shown and described in detail, various modifications and improvements thereon will become readily apparent to those skilled in the art. Accordingly, the spirit and scope of the present invention is to be limited only by the following claim(s).

What is claimed is:

1. A method for using at least one Merkle tree to authenticate revocation status about a plurality of certificates, comprising:

(a) generating a plurality of values, wherein each of the values indicates that at least one of the certificates has been revoked and wherein for each certificate, there is at least one value indicating status of the certificate;

(b) constructing at least one Merkle tree containing on a plurality of its nodes at least one of the plurality of values indicating whether at least one of the certificates has been revoked; and (c) authenticating, with a digital signature, a root node of the at least one Merkle tree to provide an authenticated root.

2. A method according to claim 1, wherein the digital signature is verifiable by an end user.

3. A method according to claim 1, wherein the values indicate which certificates have been revoked.

4. A method according to claim 3, wherein the values include a date of revocation for the certificates that have been revoked.

5. A method according to claim 1, wherein the values indicate which certificates are valid.

6. A method according to claim 1, wherein the values include a date of issue for the certificates that have been issued.

7. A method according to claim 1, wherein the values indicate which certificates have been revoked and which certificates are valid.

8. A method according to claim 1, wherein the values indicate which certificates have been revoked and which certificates have been issued.

9. A method according to claim 1, wherein the values indicate which certificates are valid and which certificates have been issued.

10. A method according to claim 1, wherein the values indicate which certificates have been revoked, which certificates are valid, and which certificates have been issued.

11. A method according to claim 1, wherein at least one of the values corresponds to more than one certificate.

12. A method according to claim 11, wherein the values include a date of issue for the certificates that have been issued.

13. A method according to claim 1, wherein certificate information determines locations of the values within the Merkle tree.

14. A method according to claim 1, wherein positions of the values within the Merkle tree provide information about certificates corresponding thereto.

15. A method according to claim 14, wherein the information includes serial numbers for each of the certificates.

16. A method according to claim 1, wherein the values correspond to serial numbers of the certificates.

17. A method according to claim 16, wherein the certificate values correspond to serial numbers of the certificates combined with additional information.

18. A method according to claim 1, wherein the authenticated root contains additional information.

19. A method according to claim 18, wherein the additional information includes date information.

20. A method according to claim 18, wherein the additional information includes an indication of at least one of: revoked, issued, and valid for describing certificate information corresponding to the values of the Merkle tree.

21. A method according to claim 1, wherein the values indicating status of certificates are leaf nodes of the Merkle tree.

22. A method, according to claim 1, further comprising:
introducing dummy items.

23. A method, according to claim 22, wherein the number of dummy items that is introduced plus the number of other items is a power of two.

* * * * *